United States Patent
Marks et al.

(10) Patent No.: US 6,463,447 B2
(45) Date of Patent: *Oct. 8, 2002

(54) OPTIMIZING BANDWIDTH CONSUMPTION FOR DOCUMENT DISTRIBUTION OVER A MULTICAST ENABLED WIDE AREA NETWORK

(75) Inventors: Joshua K. Marks, Fremont; Steve Strasnick, Mountain View; Lance Mortensen, Alamo, all of CA (US)

(73) Assignee: rStar Corporation, San Ramon, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,016

(22) Filed: Dec. 16, 1998

(65) Prior Publication Data

US 2002/0004808 A1 Jan. 10, 2002

(51) Int. Cl.[7] .............................................. G06F 17/21
(52) U.S. Cl. ...................... 707/513; 709/228; 709/235
(58) Field of Search ............................... 707/530, 1, 3, 707/500, 513, 501.1; 709/201, 202, 203, 219, 231–235, 227–228

(56) References Cited

U.S. PATENT DOCUMENTS

| | | | |
|---|---|---|---|
| 4,602,279 A | 7/1986 | Freeman | |
| 4,677,434 A | 6/1987 | Fascenda | 705/50 |
| 4,703,423 A | 10/1987 | Bado et al. | |
| 4,745,559 A | 5/1988 | Willis et al. | 705/37 |
| 5,105,184 A | 4/1992 | Pirani et al. | 345/115 |
| 5,131,020 A | 7/1992 | Liebesny et al. | 455/422 |
| 5,228,121 A * | 7/1993 | Fontaine et al. | 707/531 |
| 5,283,731 A | 2/1994 | Lalonde et al. | |
| 5,305,195 A | 4/1994 | Murphy | |
| 5,319,455 A | 6/1994 | Hoarty et al. | |
| 5,321,750 A | 6/1994 | Nadan | 380/230 |
| 5,327,554 A | 7/1994 | Palazzi, III et al. | 348/13 |

(List continued on next page.)

OTHER PUBLICATIONS

Comer, Douglas, Internetworking With TCP/IP vol I: Principles, Protocols, and Architecture, Second Edition, Prentice–Hall, Inc., pp. 283–286, Dec. 1991.*
Cranor, Lorrie Faith, et al, "Spam!", Communications of the ACM, vol. 41, No. 8, pp. 74–83, Aug. 1998.*
Oliver, Dick, et al, Netscape 3 Unleashed, second edition, Sams.net Publishing, pp. 352–353, 357–360, Dec. 1996.*
Proebsting, Todd A., et al, "Filter Fusion", POPL '96, St. Petersburg FLA USA, ACM 0–89791–769–3/95/01, pp. 119–130, Dec. 1996.*

*Primary Examiner*—Joseph H. Feild
(74) *Attorney, Agent, or Firm*—Blakely Sokoloff Taylor & Zafman LLP

(57) ABSTRACT

A method for filtering documents includes receiving the document off of a multicast channel. It is determined whether the document includes relevant information. The document is processed if it includes relevant information. A filtering agent includes a session identification reading unit that retrieves a session identification from a document transmitted over a multicast channel. The filtering agent also includes an information classification unit that retrieves meta data from the document. The filtering agent also includes a source unit that retrieves source information from the document. An evaluation unit is coupled to the session identification reading unit, information classification unit, and the source unit. The evaluation unit determines whether the document includes relevant information based on the session identification, meta data, and the source information.

20 Claims, 9 Drawing Sheets

U.S. PATENT DOCUMENTS

| | | | |
|---|---|---|---|
| 5,347,632 A | 9/1994 | Filepp et al. | 709/202 |
| 5,353,218 A | 10/1994 | De Lapa et al. | |
| 5,379,421 A | 1/1995 | Palazzi, III et al. | 707/104 |
| 5,404,505 A | 4/1995 | Levinson | 707/10 |
| 5,414,773 A | 5/1995 | Handelman | |
| 5,438,355 A | 8/1995 | Palmer | |
| 5,442,771 A | 8/1995 | Filepp et al. | |
| 5,446,919 A | 8/1995 | Wilkins | |
| 5,465,401 A | 11/1995 | Thompson | 455/558 |
| 5,512,935 A | 4/1996 | Majeti et al. | 348/9 |
| 5,524,146 A | 6/1996 | Morrisey et al. | 379/207 |
| 5,530,853 A * | 6/1996 | Schell et al. | 707/1 |
| 5,584,025 A | 12/1996 | Keithley et al. | |
| 5,604,542 A | 2/1997 | Dedrick | |
| 5,614,940 A | 3/1997 | Cobbley et al. | 348/7 |
| 5,748,190 A | 5/1998 | Kjorsvik | 345/329 |
| 5,809,242 A | 9/1998 | Shaw et al. | |
| 5,819,284 A | 10/1998 | Farber et al. | 707/104 |
| 5,867,799 A * | 2/1999 | Lang et al. | 707/1 |
| 5,945,988 A * | 8/1999 | Williams et al. | 345/327 |
| 6,012,083 A * | 1/2000 | Savitzky et al. | 709/202 |
| 6,021,419 A * | 2/2000 | Clarcke, Jr. et al. | 708/300 |
| 6,023,723 A * | 2/2000 | McCormick et al. | 709/206 |
| 6,029,195 A * | 2/2000 | Herz | 709/219 |
| 6,038,596 A * | 3/2000 | Baldwin et al. | 709/219 |
| 6,052,730 A * | 4/2000 | Felciano et al. | 709/225 |

\* cited by examiner

OPTIMIZING BANDWIDTH CONSUMPTION FOR DOCUMENT DISTRIBUTION OVER A MULTICAST ENABLED WIDE AREA NETWORK

The present U.S. patent application is related to U.S. patent application Ser. No. 09/216,018, pending, entitled "A Method and Apparatus for Supporting a Multicast Response to a Unicast Request for a Document," which is assigned to the corporate assignee of the present invention.

FIELD OF THE INVENTION

The present invention relates to computer networks used for transmitting and distributing documents in the form of a collection of digital data. More specifically, the present invention relates to a method and apparatus for dynamically and intelligently caching documents at a local site utilizing an agent to filter incoming multicast streams of documents.

BACKGROUND OF THE INVENTION

The Internet has become an expansive backbone of communication with a vast repository of information available in various formats. The reason for its popularity is due in large part to the development of the hypertext mark-up language (HTML), its related formats such as extensible mark-up language (XML),. dynamic HTML (DHTML), and the associated Transmission Control Protocol/Internet Protocol (TCP/IP) based communications protocols Hyper Text Transfer Protocol, File Transfer Protocol (FTP), and User Datagram Protocol (UDP). HTML has transformed the Internet from the black and white world of text into the vibrant multi-media environment that it is today. HTML defines the syntax and placement of special, embedded directions that instruct a web browser on how to display the contents of a document which is made up of one or more HTML text files which in turn reference associated media files, like Joint Photographic Experts Group (JPEG) graphics, Graphics Interchange Format (GIF) animation files, or other embedded files of any number of formats including text, images, and other support media. HTML instructs a web browser client application on how to make a document interactive through special hypertext links or though embedded programs like Java applets, which connect a document with other documents, as well as with other Internet resources. In addition, embedded programs can and often do contain their own interactive logic in the form of executable code and the associated resources. HTML and similar/related technologies are responsible for unifying pictures, sounds, and text in a document allowing the presentation of rich, multi-media filled web pages on a wide variety of computer based display devices and appliances that have propelled the Internet as a new medium for worldwide information exchange and commerce.

The full potential of the Internet as a medium for communication, education, entertainment and commerce remains unfulfilled due to problems with its performance and reliability. The Internet's performance limitations stem from its basic architecture, which is not optimized for distribution of data-intensive multimedia content. Internet performance is currently limited by the weakest link in the chain between the client and the server. Bottlenecks may be caused by the "last-mile" connection to the user, the infrastructure of the Internet Service Provider (ISP), the gateway to the Internet backbone, or the content provider's Web server. For example, the Internet frequently becomes overloaded when transmitting the same data streams from popular Web site servers to millions of individual users.

It is generally true that wide area network (WAN) connections cost more and are slower than local area network (LAN) connections. What is needed is an effective method and apparatus for minimizing or eliminating redundant document transmissions across wide area network connections. Document transmission may include the transmission of data files or a collection of data files. It may include the transmission of text, audio, media, embedded programs, executable code, or other data that is published at a host server. In a wide area network of geographically dispersed homogeneous information consumers, the need for such an invention is most apparent. This is even more so when the users are consuming high-bandwidth data like video or audio files.

SUMMARY

A method and apparatus for dynamically filtering documents transmitted on one or more multicast channels according to a first embodiment of the present invention is disclosed. A document is received off of a multicast channel. It is determined whether the document includes relevant information. The document is processed if the document includes relevant information.

A filtering agent according to a second embodiment of the present invention is disclosed. The filtering agent includes a session identification reading unit that retrieves a session identification from a document multicasted over a multicast channel which identifies the original requester of the document. The filtering agent includes an information classification unit that retrieves published meta data and generates new meta data for each document transmitted with which, in part, it bases its relevance decisions. The filtering agent includes a source unit that retrieves source information from the document. An evaluation unit is coupled to the session identification reading unit, information classification unit, and the source unit. The evaluation unit determines whether the document includes relevant information based on the session identification, data information, the source information, and the channel of distribution. Based on the results of the evaluation unit, the filtering agent either stores the document locally for later use, forwards the document to the original requestor if that user resides within the receiving location's local area network, or discards the document as not relevant to the local users.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

A method and apparatus for optimizing bandwidth utilization for document distribution over a wide area network is disclosed. In the following detailed description, numerous specific details are set forth in order to provide a thorough understanding of the present invention. It would be understood by those skilled in the art that the present invention may be practiced without these specific details. In other instances, well-known methods, procedures, components, and circuits have not been described in detail so as not to obscure the present invention.

Figure 1:
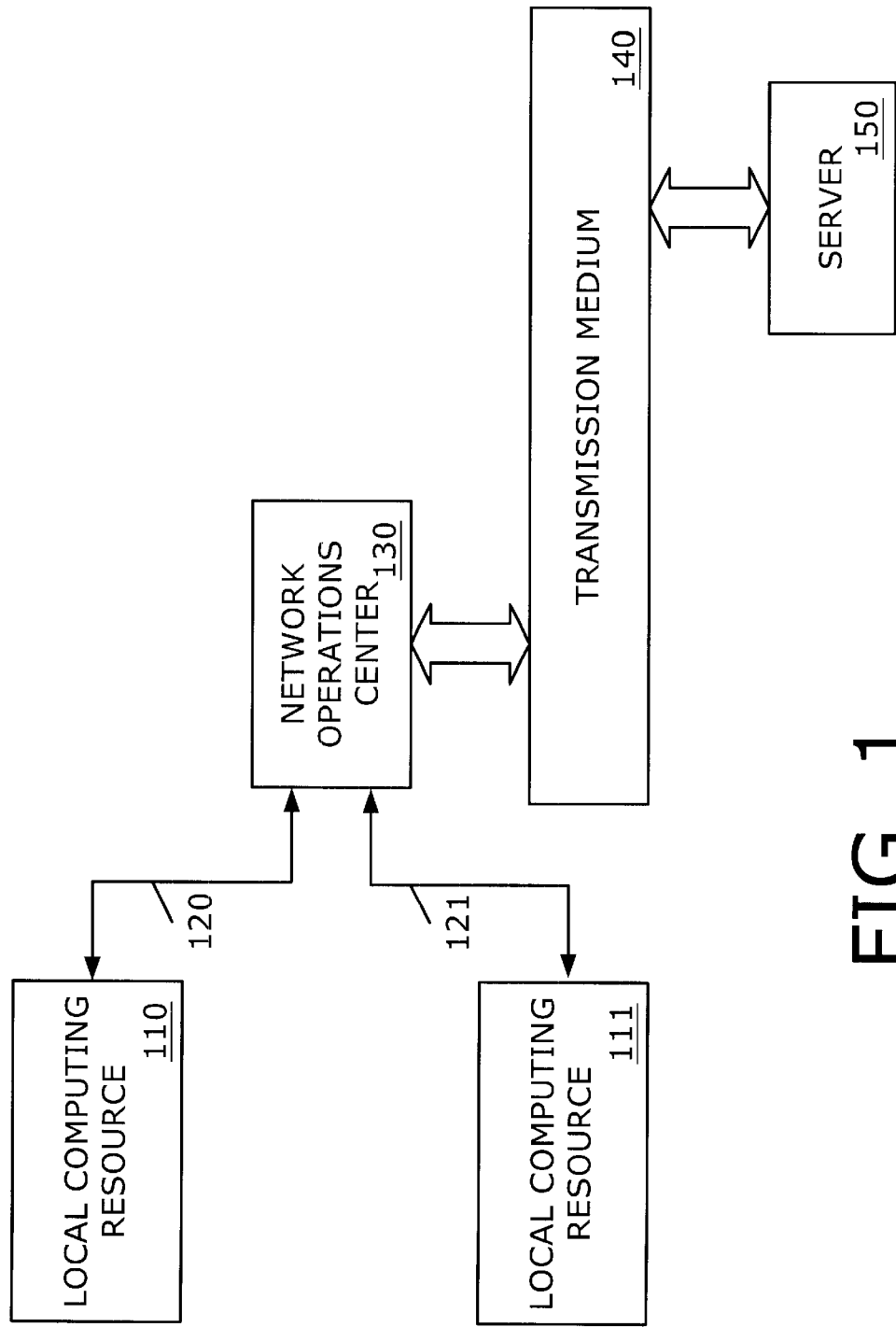
FIG. 1 is a block diagram of a configuration of a network according to an embodiment of the present invention.

FIG. 1 is a block diagram of a configuration of a network 100 according to an embodiment of the present invention. Block 140 represents a transmission medium. The transmission medium 140 transmits documents between computer systems coupled to the transmission medium 140. The transmission medium 140 may be implemented by a twisted pair telephone line, cable, fiber optics line, satellite transmission medium, or other transmission medium or combination of media. According to an embodiment of the present invention, the transmission medium 140 is the Internet.

Block 150 represents a server computer system connected to the Internet 140. The server computer system 150 may be, for example, be one or several Hyper Text Transfer Protocol (HTTP) servers that store HTML and HTML associated files. Alternatively, the server computer system 150 may be another type of server that stores other types of network resources and operates as a content host that transmits documents via other protocols.

Blocks 110 and 111 represent local computing resources. Each of the local computing resources 110 and 111 may include a single computer system, or a plurality of computer systems connected together in a local area network or wide area network. The local area network or wide area network may be managed by a local server.

A network operations center 130 is coupled to the local computing resource 110 via connection 120 and the local computing resource 111 via connection 121. The connections 120 and 121 may be implemented individually as a twisted pair telephone line, cable, fiber optics line, satellite transmission, or other connection media. Each connection 120 and 121 may include one of or a combination of the described connection media so long as the connection supports the routing of multicast packets on assigned multicast channels or addresses. The network operations center 130 is also coupled to the Internet 140. The network operations center 130 operates to provide the local computing resources 110 and 111 with access to the Internet 140 and access to network resources. The network operations center 130 may operate as an ISP to the local computing resources 110 and 111. According to an embodiment of the present invention, the network operations center 130 fetches and caches and later on delivers documents from the server 150 to the local computing resources 110 and 111 when requested. The network operations center 130 multicasts documents requested by one of the local computing resource 110 or 111 to the non-requesting local computing resource 110 or 111. By sharing documents that contains relevant information to the non-requesting local computing resource, the network operations center 130 provides the local computing resource 110 and 111 with documents that users on both the local computing resources 110 and 111 are likely or guaranteed to consume at some point of time. Sharing documents allows accessing documents in the network 100 to be more efficient. It also delivers a more responsive user experience and facilitates the delivery of high bandwidth and/or time dependent documents. The local computing resources 110 and 111 filter the incoming documents from the network operations center 130. Before storing and/or forwarding documents received from the network operations center 130, the local computing resources 110 and 111 make sure that the documents are relevant for the purposes of the local computing resources 110 and 111 and there is a probability of used or were transmitted in response to a local user's request. This allows the storage device in the local computing resources 110 and 111 to be used efficiently.

It should be appreciated that any number of local computing resources may be connected to the network operations center 130 and that any number of network operations centers may be connected to the Internet 140. It should also be appreciated that any number of server computer systems may be connected to the Internet 140.

Figure 2:
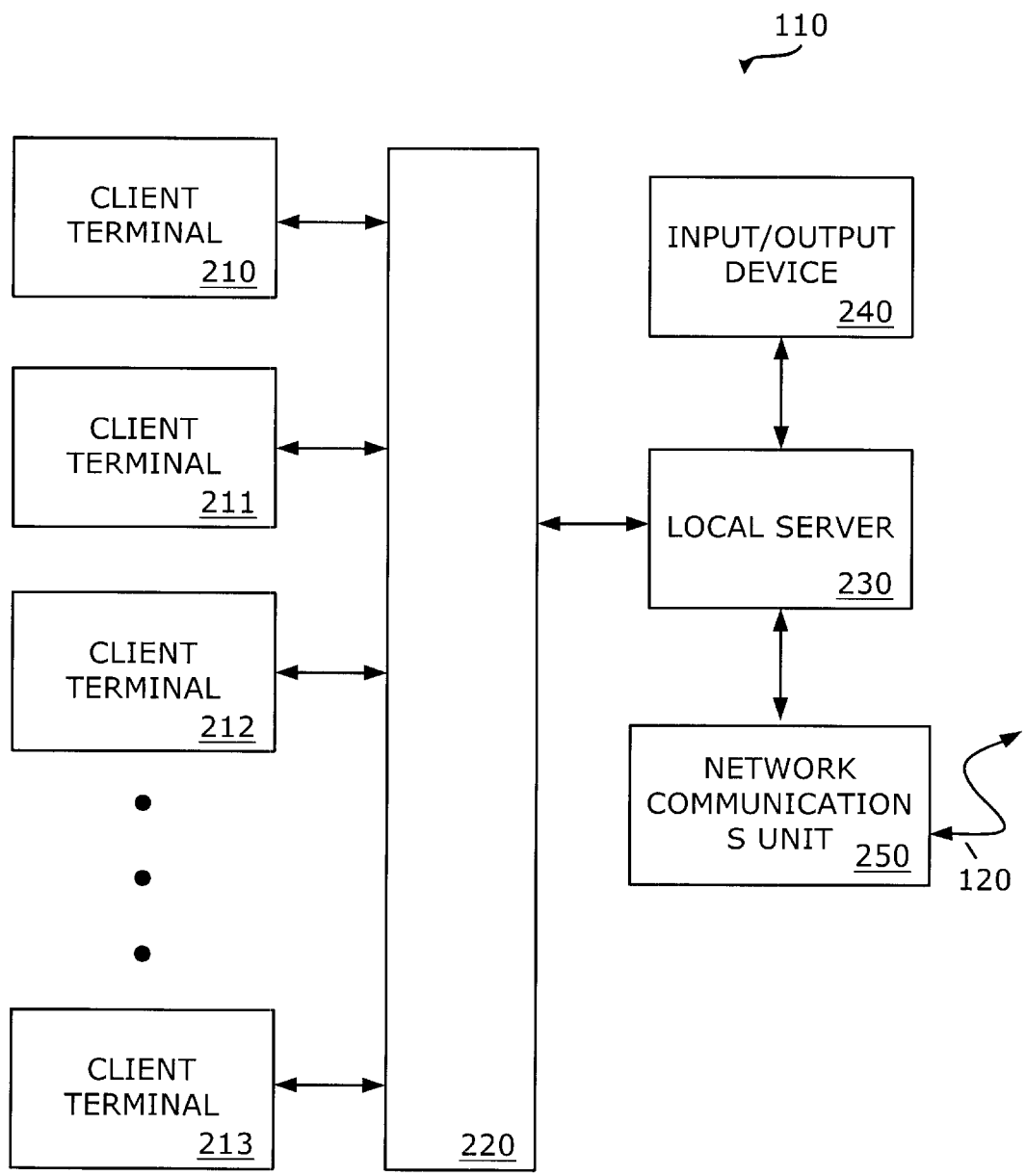
FIG. 2 is a block diagram of a local computing resource according to an embodiment of the present invention.

FIG. 2 is a block diagram of the local computing resource 110 according to an embodiment of the present invention. The local computing resource 110 shown in FIG. 2 may also be implemented as the local computing resource 111 (shown in FIG. 1). The local computing resource 110 includes a plurality of client terminals 210–213. The client terminals 210–213 may be general purpose computer systems, set-top boxes, or other types of client terminal devices. Each client terminal includes at least an input device and a display device. Client terminals 210–213 are connected together in a network via network connection 220 which should, but does not necessarily need to support multicast transmissions.

The local computing resource 110 includes a local server 230 which in another embodiment could be a logical process on a single user's machine. The local server 230 operates as a local caching proxy server that runs communications proxy and storage/cache services for the client terminals 210–213. The proxy services take requests for Internet services, such as HTTP, FTP, and Telnet, from the client terminals 210–213 and forwards them to the network operations center 130 (shown in FIG. 1) as appropriate according to the protocol of the local computing resource 110. The proxies provide replacement, re-directed or intermediary connections and act as gateways to the services. According to an embodiment of the present invention, the local server 230 includes a storage device (not shown) that stores documents pre-fetched or previously fetched by the network operations center 130. When a HTTP request is made by a client terminal, the proxy service run by the local server 230 checks the storage device to determine whether the documents requested by the client terminal are cached in the storage device. If the documents are cached in the storage device, the documents from the storage device are sent to the client terminal. If the documents are not cached in the storage device, the proxy service forwards the request to the network operations center 130. In an alternate embodiment, the network connection 120 itself is interconnected to the Internet 140, with a reply-to address of a network communications unit 250.

The network communications unit 250 is coupled to the local server 230. The is network communications unit 250 operates to connect the local server 230 to the network operations center 130 via connection 120. The network communications unit 250 may include a telephone modem, cable modem, satellite receiver/transmitter, router, or other communication devices. The network communications unit 250 may include one or a plurality of the described communication devices. The network communications device supports both unicast and multicast connections.

The local computing resource 110 may optionally include an input/output device 240. The input/output device 240 may be coupled to the local server 230 as shown in FIG. 2. Alternatively, the input/output device 240 may be coupled to the network connection 220, to the network communication unit 250, or to a client terminal 210–213. The input/output device 240 may include one or more printers, display video monitors, video cameras, or other input/output devices.

Figure 3:
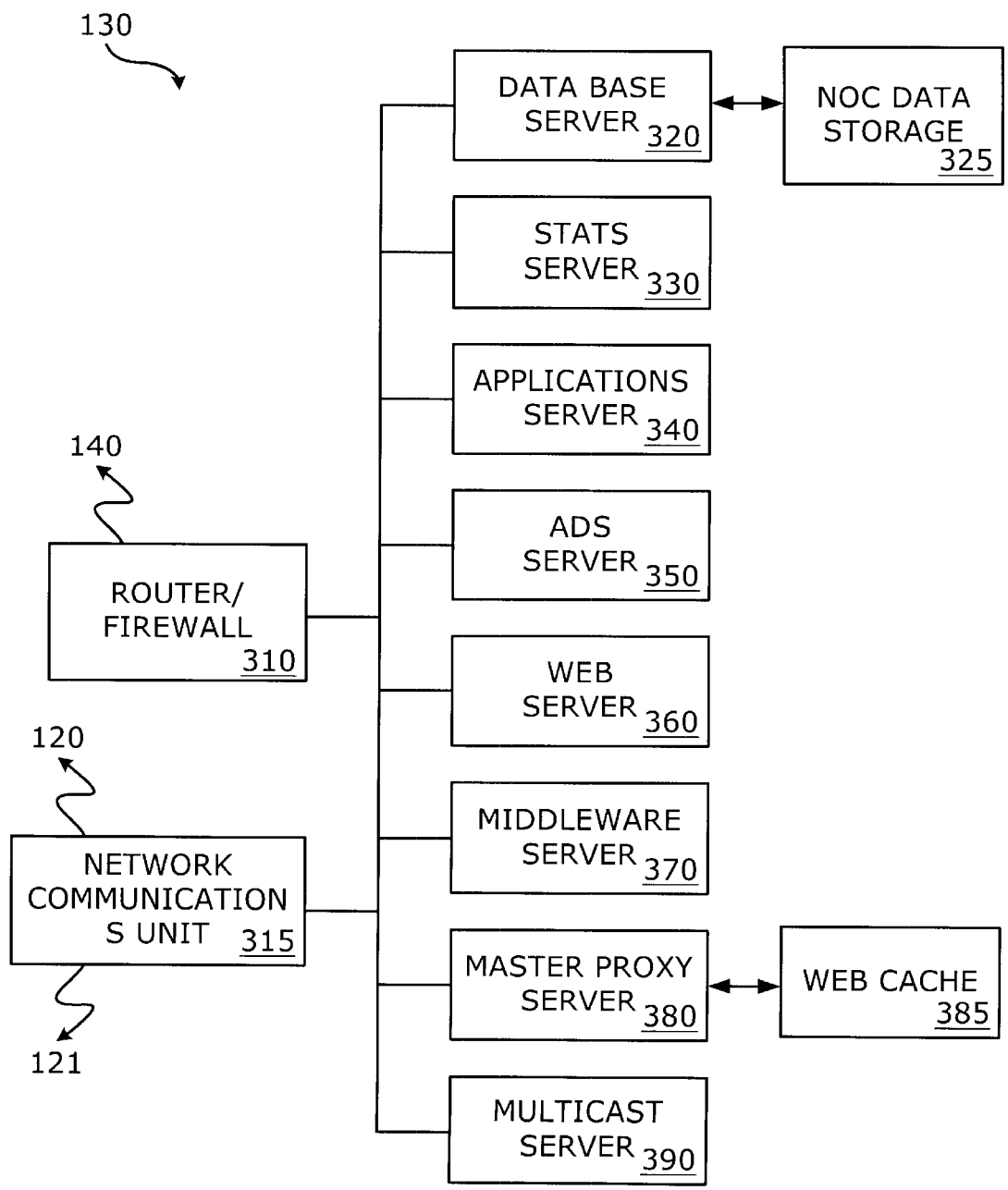
FIG. 3 is a block diagram of a network operations center according to an embodiment of the present invention.

FIG. 3 is a block diagram of a network operations center 130 according to an embodiment of the present invention. The network operations center 130 includes a router/firewall 310. The router/firewall 310 connects the network operations center 130 to the Internet 140. The router/firewall 310 operates to prevent unauthorized access to the network operations center 130. The router/firewall 310 analyzes all messages entering the network operations center 130 to determine whether they meet specified security criteria.

The network operations center 130 includes a network communications unit 315. The network communications unit 315 operates to connect the network operations center 130 to the local computing resources 110 and 111 via connections 120 and 121. The network communications unit 315 may include a telephone modem, cable modem, satellite receiver/transmitter, router, or other communication devices. The network communications unit 315 may include one or a plurality of the described communication devices. The network communications device supports both unicast and multicast connections.

The network operations center 130 includes a plurality of servers that perform specific functions at the network operations center 130. According to an embodiment of the present invention where the network operations center 130 includes a plurality of computer systems connected in a network, each server may be implemented by a single or a plurality of computer systems. Alternatively, in an embodiment of the present invention where the network operations center 130 is a single computer system, the servers may be implemented in software as software modules or in hardware as individual hardware components.

In one embodiment, the network operations center 130 includes a database server 320 that manages data in a network operations center data storage 325. Data in the network operations center data storage 325 may include data corresponding to users with access to client terminals, statistical data on and profiles of the users, privileges granted to the users, advertisement data, logs corresponding to user activities, billing status data, preference data, and other types of data. In one embodiment, this database would likely also hold the list of trusted sources of data/documents.

In one embodiment, the network operations center 130 includes a statistics server 330. The statistics server 330 interfaces with data stored in the network operations data storage 325 to generate real-time usage statistics. For example, the statistics server 330 may access an activity log and a statistics database in the network operations center data storage 325 and generate real-time usage statistics.

In one embodiment, the network operations center includes an applications server 340. The applications server 340 supports web-based services such as an HTML enabled e-mail systems, chat systems, discussion boards, and communication gateways. The application server 340 may also support the server side of client/server applications. The applications server 340 may reside inside the network operations center 130 as shown in FIG. 3, or alternatively reside outside of the network operations center 130.

In one embodiment, the network operations center 130 includes an advertisement server 350. The advertisement server 350 schedules and manages advertisement placements that are displayed on client terminals 210–213 (shown in FIG. 2) at local computing resources 110 and 120 (shown in FIG. 1). It should be appreciated that in an alternate embodiment of the present invention, the functionality of the advertisement server 350 may be implemented in a middleware server 370. Additional uses and details of the advertisement server 350 can be found in U.S. patent application Ser. No. 09/227,476 filed Jan. 8, 1999, entitled "Micro Targeted Advertising," which is assigned to the corporate assignee of the present invention.

In one embodiment, the network operations center 130 includes a web server 360. The web server 360 publishes HTML documents and related files via TCP/IP, HTTP, FTP, UDP, and other protocols.

In one embodiment, the network operations center 130 includes a middleware server 370. The middleware server 370 interfaces with the database server 320, statistics server 330, applications server 340, usually via the web server 360, in response to requests from the client terminals 210–213 to dynamically publish web pages, send and receive documents to and from client terminals, as well as to establish and track user sessions on client terminals. The middleware server 370 interfaces with the database server 320 to store, log, retrieve, and process session related data. The middleware server 370 also acts as a communication log-in proxy for remote applications and serves to associate sessions with users, and terminal entities so as to associate logged usage with users. Additional uses and details on the identification of sessions can be found in U.S. patent application Ser. No. 09/213,614 filed Dec. 17, 1998, entitled "ENTITY MODEL RELATIONSHIP ENABLING PRIVILEGE TRACKING ACROSS MULTIPLE TERMINALS," which is assigned to the corporate assignee of the present invention.

In one embodiment, the network operations center 130 includes a master proxy server 380. The master proxy server 380 handles and redirects requests to appropriate locations and servers. The master proxy server 380 interfaces with the master web cache 385. According to an embodiment of the present invention, the master proxy server 380 receives a request for a document from a local computing resource. The master proxy server 380 determines whether the document is stored in the master web cache 385. If the document is stored in the master web cache 385, the document from the master web cache is delivered to the local computing resource by the master proxy server 380. If the document is not stored in the master web cache 385, or is out of date, the master proxy server 380 retrieves the document on behalf of the local computing resource. The master proxy server 380 may cache a copy of the document in the master web cache 385. The master proxy server 380 determines where and how the document is transmitted. It should be appreciated that the master web cache 385 may be implemented by any known caching device. The document may be either unicasted or multicasted to the requesting local computing resource and other local computing resources as described in more detail below.

In order to reply to a unicast request via a multicast channel and recover potential packet loss, a sender (the master proxy server 380) buffers sent packets and re-sends on a negative acknowledgment. By removing unneeded replies for receipt acknowledgment while assuring complete intact delivery, IP ramp-up lag is minimized.

The network operations center 130 includes a multicast server 390. The multicast server 390 sends documents or any file or group of files to specified directories on pre-defined local servers via Internet Protocol (IP) Multicast protocols or other one-to-many transmission protocols. The multicast server 390 manages multicast channels on which the documents are transmitted. According to an embodiment of the invention, the local server 230 (shown in FIG. 2) where functions and resources of the network operations center 130 may be replicated, the multicast server 390 packages and schedules reliable multicast file transfers of documents, such as documents stored in the web cache 385 and in the network operations center data storage 325 onto the local server 230. It should be appreciated that the multicast server 390 may also multicast replicated web sites such as a directory tree of HTML and associated HTML files, such as JPEG, GIF, JAVA, and other files, from the web server 360, applications such as installable software packages from the applications server 340, and data and resources from other servers on the network operations center 130 or servers 150 connected to the Internet 140 onto the local server 230.

It should be appreciated that not all of the servers described are necessary for implementing the network operations center 130. According to an embodiment of the present invention, the network operations center 130 may be implemented using only the master proxy server 380, the middleware server 370, and the database Server 320 with its associated data storage 325.

Figure 4:
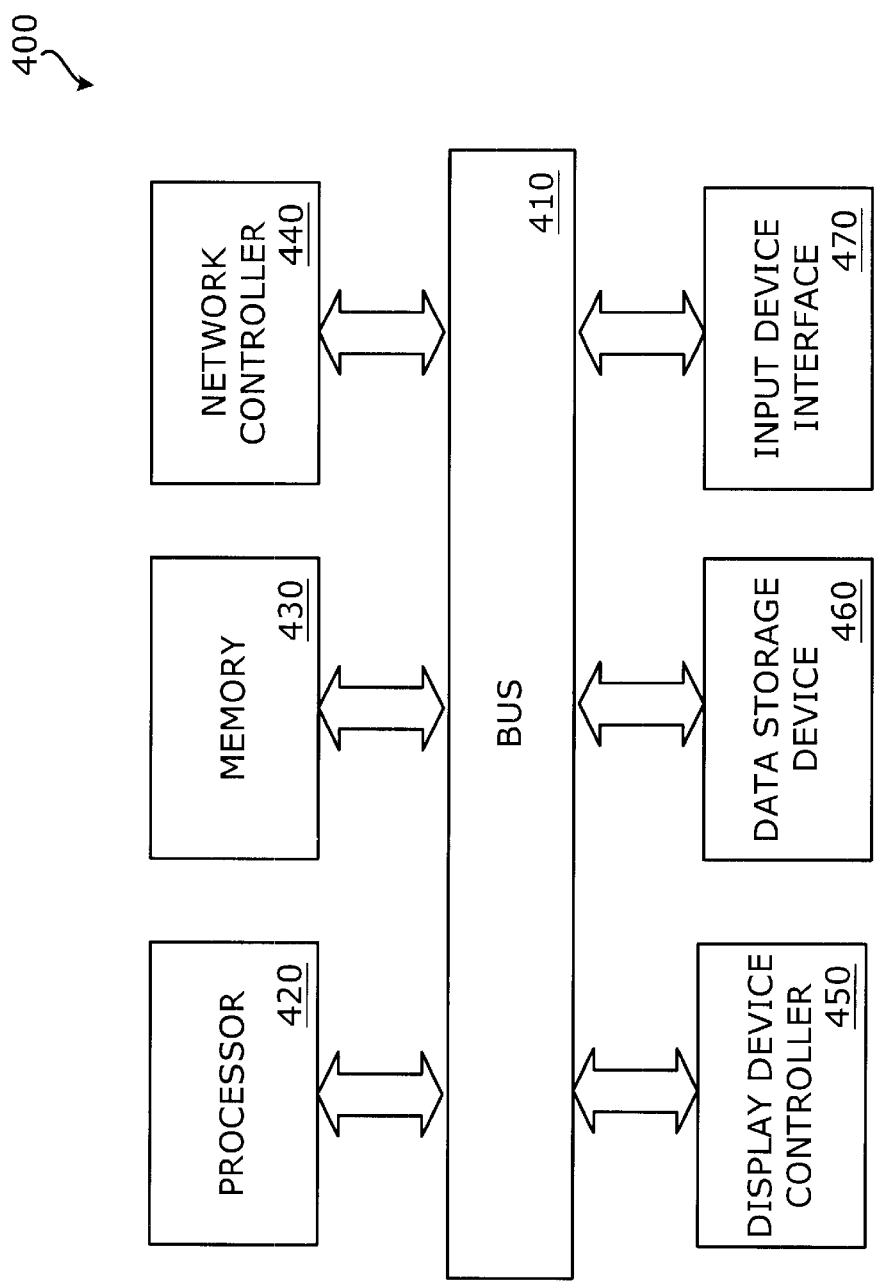
FIG. 4 is a block diagram of a computer system according to an embodiment of the present.

FIG. 4 is a block diagram of a computer system 400 according to an embodiment of the present invention. The computer system 400 may be used to implement the network operations center 130 (shown in FIG. 1) in an embodiment of the present invention where the network operations center 130 is implemented by a single computer system. The computer system 400 may be used to implement or one or more of the servers in the network operations center 130 in an embodiment of the present invention where the network operations center 130 is implemented by a network of computer systems. It should be appreciated that the computer system 400 may also be used to implement one of the client terminals 210–213 (shown in FIG. 2) and the local server 230 (shown in FIG. 2).

The computer system 400 includes a bus 410. The bus 410 may be a single bus or a combination of multiple buses. As an example, the bus 410 may include a Peripheral Component Interconnect (PCI) bus, an Industry Standard Architecture (ISA) bus, or a combination of other buses. A processor 420 is coupled to the bus 410. The processor 420 processes data signals.

A memory 430 is coupled to the bus 410. The memory 430 may store instructions and code represented by data signals that may be executed by the processor 420. A network controller 440 is coupled to the bus 410. The network controller 440 links the computer system 400 to a network of computers (not shown in FIG. 4) via a connection (not shown) or a network communications unit (not shown in FIG. 4) and supports communication among the machines. A display device controller 450 may be coupled to the bus 410. The display device controller 450 allows coupling of a display device to the computer system 400 and acts as an interface between the display device and the computer system 400. A data storage device 460 is coupled to the bus 410. The data storage device 460 may be a hard disk drive, a floppy disk drive, a CD-ROM device, a flash memory device or other mass storage device or any combination thereof. An input device interface 470 is coupled to the bus 410. The input device interface 470 allows coupling of a keyboard, pointing device, or other input device to the computer system 400 and transmits data signals from an input device to the computer system 400.

It should be appreciated that not all the components described in the computer system 400 may be necessary for implementing one of the network operations center 130, a server on the network operations center 130, a local server 230, or a client terminal at the local computing resource 110. The present invention is related to the use of the computer system 400 to filter and distribute documents and data. According to one embodiment, filtering and distributing documents is performed by the computer system 400 in response to the processor 420 executing a sequence of instructions in memory 430. Such instructions may be read into memory 430 from another computer-readable medium, such as data storage device 460, or from another source via the network controller 440. Execution of the sequence of instructions causes the processor 400 to filter a document, as will be described hereafter. In an alternate embodiment, hardwired circuitry may be used in place of or in combination with software instructions to implement the present invention. Thus, the present invention is not limited to any specific combination of hardware circuitry and software.

Figure 5:
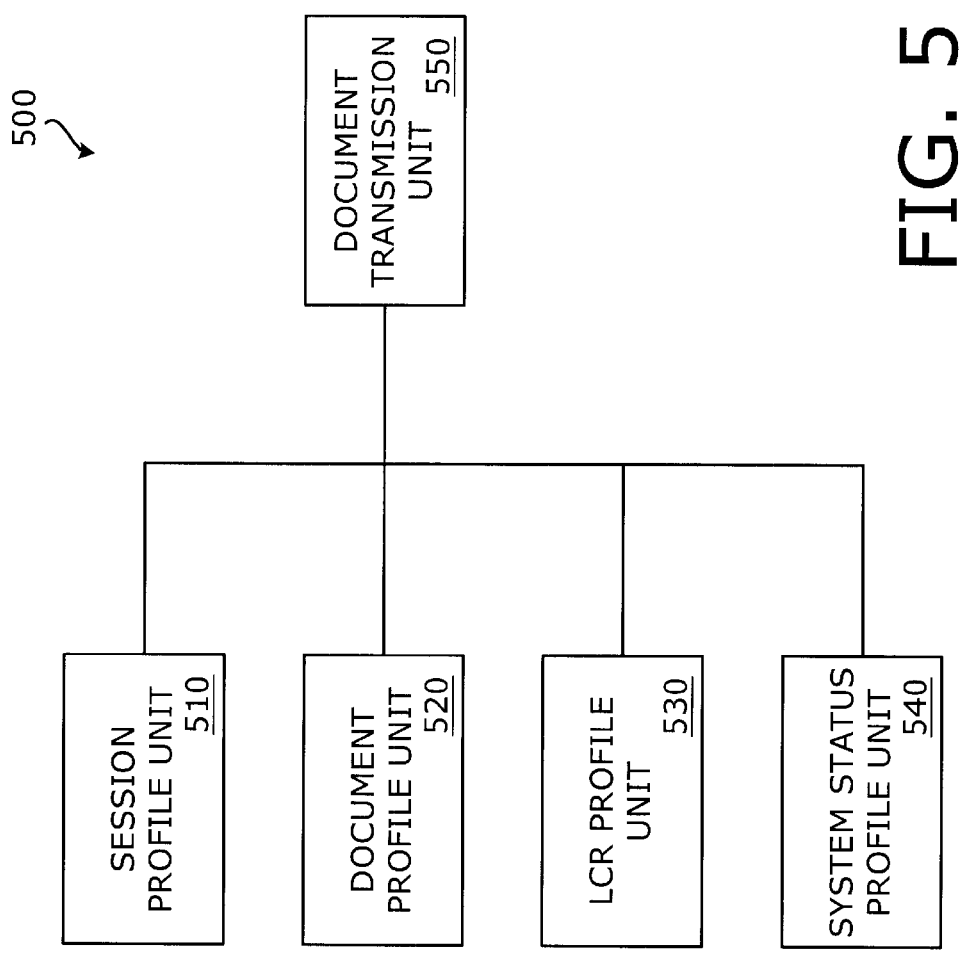
FIG. 5 is a block diagram of a document manager residing in a master proxy server according to an embodiment of the present.

FIG. 5 is a block diagram of a document manager unit 500 residing in the master proxy server 380 (shown in FIG. 3) according to an embodiment of the present invention. In a preferred embodiment of the present invention, the document manager unit 500 is implemented by software and resides in main memory 430 (shown in FIG. 4) as a sequence of instructions in a computer system 400 that may be implemented as an extension of the master proxy server 380 or a network operations center 130 having a master proxy server 380. It should be appreciated that the document manager unit 500 may also be implemented by hardware as components coupled to the bus 410 (shown in FIG. 4), a combination of both hardware and software, or a plurality of computers working together as performance and traffic requirements dictate.

The document manager 500 includes a session profile unit 510. The session profile unit 510 interfaces with the middleware server 370 (shown in FIG. 3) to obtain session information relating to the session run at a local computing resource that is requesting a document and currently active user sessions as well as user and session information associated with the specific request for a document. In an alternate embodiment, the session profile unit 510 might query the database server 320 (shown in FIG. 3) directly to obtain this information. The real purpose of the middleware server 370 is to simplify getting information out of the database server 320, each server and client actually could talk to the database server 320 directly, but this would be a lot more work and load on each of these systems. In one embodiment, the middleware server 370 reports to the master proxy server 380 all new session IDs as they are assigned as well as the associated user and session privileges and any other relevant data. The master proxy server 380 also messages at the end of a session to purge the session ID from the master proxy server's "Current session" table in memory. The session information includes information relating to a user that is requesting the document and a set of access privileges that belongs to the user or session. The session profile unit 510 transmits the session information to the document transmission unit 550.

In one embodiment, the document manager 500 includes a document profile unit 520. The document profile unit 520 receives a copy of the document that constitutes the document requested by the local computing resource. The document profile unit 520 obtains, generates and formats meta data relating to the content of each document that has been requested and allows the document transmission unit 550 to determine where and how to transmit the documents. According to a first embodiment of the present invention, the document profile unit 520 reads and re-formats recognized meta tags in the document that were placed there by the original publisher of the document and provide subject matter, size, source, rating, keyword, or other information relating to the document and forwards the meta data to the document transmission unit 550. According to a second embodiment of the present invention, the document profile unit 520 reads the content of the document to determine relevant subject matter, size, source, or other information relating to the document and forwards the meta data to the document transmission unit 550. In another example, the document profile unit 520 may also interface with the master proxy server 380 (shown in FIG. 3) on the network communications interface to determine if the document being requested by a user has been "popular" with a specific class of local computing resources and forwards this meta data to the document transmission unit 550. According to this embodiment of the present invention, the document profile unit 520 may generate its own meta tags in its own format that are transmitted with the document or in some other way append or associate its aggregated formatted meta data to the source document. Some of the data, like source information, could be evaluated even before the document is received and help speed the evaluation process. For example, an excluded source could redirect to a unicast reply even before the source document arrives for evaluation by the other units. The meta tags may be transmitted in the header of the document, the body of the document, or using other techniques.

In one embodiment, the document manager 500 includes a local computing resource (LCR) profile unit 530. The local computing resource profile unit 530 interfaces with the middleware server 370 to obtain profile information relating to local computing resources that are connected to the network 100 (shown in FIG. 1). The profile information includes information relating to the subject matter, size, source of the document, or other content associative parameters that a local computing resource would like to receive or explicitly rejects (e.g. documents published from a suspect source). The profile information may also include the identity of content class associated multicast channels on which to transmit the document to the local computing resource. The local computing resource profile unit 530 transmits the profile information to the document transmission unit 550.

In one embodiment, the document manager 500 includes a system status profile unit 540. The system status profile unit 540 includes a list of local computing resources and the multicast channels each local computing resource are listening to. The system status profile unit 540 also includes associated target content profiles for each of the active multicast channels. The system status profile unit 540 operates to inform the document transmission unit 550 of current transmission latencies for all active multicast channels. According to one embodiment, the system status profile unit 540 monitors activity on multicast channels and transmits traffic information to the document transmission unit 550. The system status profile unit 540 informs the document transmission unit 550, via the traffic information, if the multicast channel to which a document is to be re-directed is backed-up beyond some maximal latency. In response, the document transmission unit 550 may generate a unicast reply to the original requester since a multicast reply would require too much time due to an over subscribed multicast channel. In one embodiment, a document may be placed in a queue for evaluation and possible multicast when traffic subsides.

A document transmission unit 550 is coupled to the session profile unit 510, the document profile unit 520, and the local computing resource profile unit 530, and the system status profile unit 540 in a way such that transferred information (meta data) from the sources arrives with or is associated with the document for each requested document. Some might be appended as meta tags in the body, and others as announcements prior to the arrival of the document. Some of this compiled meta data should be passed on to the receivers so as to keep them from having to re-generate the meta data. This is further described below in relation to FIG. 6. The document transmission unit 550 operates to determine where and how to transmit the requested document and facilitates the transmission. The document transmission unit 550 receives session information from the session profile unit 510. The session information may be used by the document transmission unit 550 to determine whether to transmit the document requested by a user at a local computing resource to the requesting local computing resource only using unicast techniques, to transmit the document requested to the requesting local computing resource and to other non-requesting local computing resources at the same time using multicast techniques, or to transmit the document requested to the requesting local resource using unicast techniques and to other non-requesting local computing resources using multicast techniques at a later time or upon further determination. This decision might also take into account network traffic and capacity as reported by the system status unit (540), (e.g. the multicast channel is backed-up and has a delivery latency greater them a maximal value.) In such a case the document must be sent back to the original requester via unicast in order to avoid a request time-out on the client end. The document can then be placed in a queue for evaluation and possible multicast later on when traffic subsides. The session information may include information relating to the user and access privileges that belong to the user. For example, a request for a document by a user with a high level of access privileges such as "instructor class access privileges" may effectuate the document requested to be multicasted to the requesting and non-requesting computing resources at the same time and perhaps on a priority or reserved channel/address. A user with middle level access privileges such as "contributor class access privileges" may effectuate the document requested to be unicasted to the requesting local computing resource and multicasted to non-requesting local computing resources at a later time or upon further determination or sent on a lower priority channel. A user with low level access privileges such as "viewer class access privilege" may effectuate the document requested to be unicasted only to the requesting local computing resource or only multicasted if the document itself triggers a multicast as described below. It should be appreciated that other schemes of determining where and how the document is transmitted may be utilized. Such schemes may relate directly to the purpose and use of the network and the type of document being consumed.

The document transmission unit 550 receives meta data from the document profile unit 520 and local profile information from the local computing resource profile unit 530. The meta data and the profile information may be used by the document transmission unit 550 to determine whether or not to cache a copy of a requested document onto the web cache 385. The meta data and profile information may also be used by the document transmission unit 550 to determine whether or not to multicast the document to non-requesting local computing resources and if so to which ones by selecting one or more active multicast channels. In one embodiment, the network operations center 130 announces channel changes or temporary channel assignments to the appropriate local computing resources. For example, an "Instructor" in one location tells 10 students at ten different locations to look at a specific document which may contain a live multicasted video stream. The master proxy server 380 dynamically assigns a multicast channel to send the instructor's document back on, and at the same time, inform the ten other locations of this dynamic channel assignment (via a separate "Announcement" channel.). According to an embodiment of the present invention, the document transmission unit 550 multicasts a document to a non-requesting local computing resource if the meta data corresponding to the document matches the profile information for a currently active multicast channel. It should be appreciated that other schemes for determining whether or not to multicast the document to non-requesting local computing resources may be utilized. According to an alternate implementation, the network operations center 130 reports to all matching local computing resources what channel that matching document is going to be sent on, and when on a separate "Announcement" multicast channel that all local computing resources listen to. According to one aspect of this embodiment, the network operations center 130 waits for "I'm listening" acknowledgements from all target local computing resources before sending the document.

It should be appreciated that how, when and in what order meta data is sent to the local computing resource 110 may be important. Some meta data may be appended as re-formatted meta tags, others may be sent prior to the receipt of the document so as to allow the computing resource 110 to make a fast decision that will allow the local computing resource to run more efficiently.

The document transmission unit 550 also facilitates the transmission of documents. For example, if a determination is made that the document being requested is to be unicasted back to the requesting local computing resource, even if it is also to be multicasted to a set of non-requesting local computing resources, the document transmission unit 550 may redirect the server sourcing (serving/hosting) the document to transmit the document directly to the requesting local computing resource or though a separate proxy server or connection. On the other hand, if it is determined that the network operations center 130 (shown in FIG. 1) should multicast a copy of the requested document or examine the requested document, the document transmission unit 550 may direct the server sourcing the document to transmit the document to both the requesting local computing resource and the network operations center 130 or alternatively have the document transmitted only to the network operations center 130 and have the network operations center 130 transmit the document to the requesting local computing resource. If a determination is made that the document being requested is to be multicasted, the document transmission unit 550 transmits the document and an identity of an appropriate multicast channel in which the document is to be sent on to the multicast server 390 (shown in FIG. 3). The session identification as well as some or all of the aggregated meta data, and perhaps other session data like the class of the original requester, (e.g. "an instructor you trust asked for this document") is included with the document as it is transmitted. In an alternate embodiment, the master proxy server 380 may operate as the multicast server 390 directly by extending its features to handle re-sending packets on a negative acknowledgement. According to an embodiment of the present invention, the session identification is appended in a header of the document as a cookie. According to an alternate embodiment of the present invention, the session identification is appended as a CGI variable. It should be appreciated that the session identification may be transmitted with the document using other techniques.

It should be appreciated that the document manager 500 may transmit a document to local computing resources with or without transmitting meta tags corresponding to the document. It should also be appreciated that the document manager 500 may multicast the document to local computing resources without taking into account the session information associated with the original request, meta data in the document, or profiles of local computing resource where the document is to be multicasted. As described, the document profile unit 520 may generate and append meta data. It should also be appreciated that the session profile unit 510, the local computing resource profile unit 530, and the system status profile unit 540 may also generate and append meta data.

The session profile unit 510, document profile unit 520, local computing resource profile unit 530, and the document transmission unit 550 may be implemented using any known circuitry or technique. In an embodiment of the present invention where the document manager unit 500 is implemented in hardware, the session profile unit 510, document profile unit 520, local computing resource profile unit 530, and the document transmission unit 550 all reside in a single semiconductor substrate. In a preferred embodiment of the present invention, the document manager 500 is implemented by software proxy server plug-ins or extensions, and/or packet filter processes.

Figure 6:
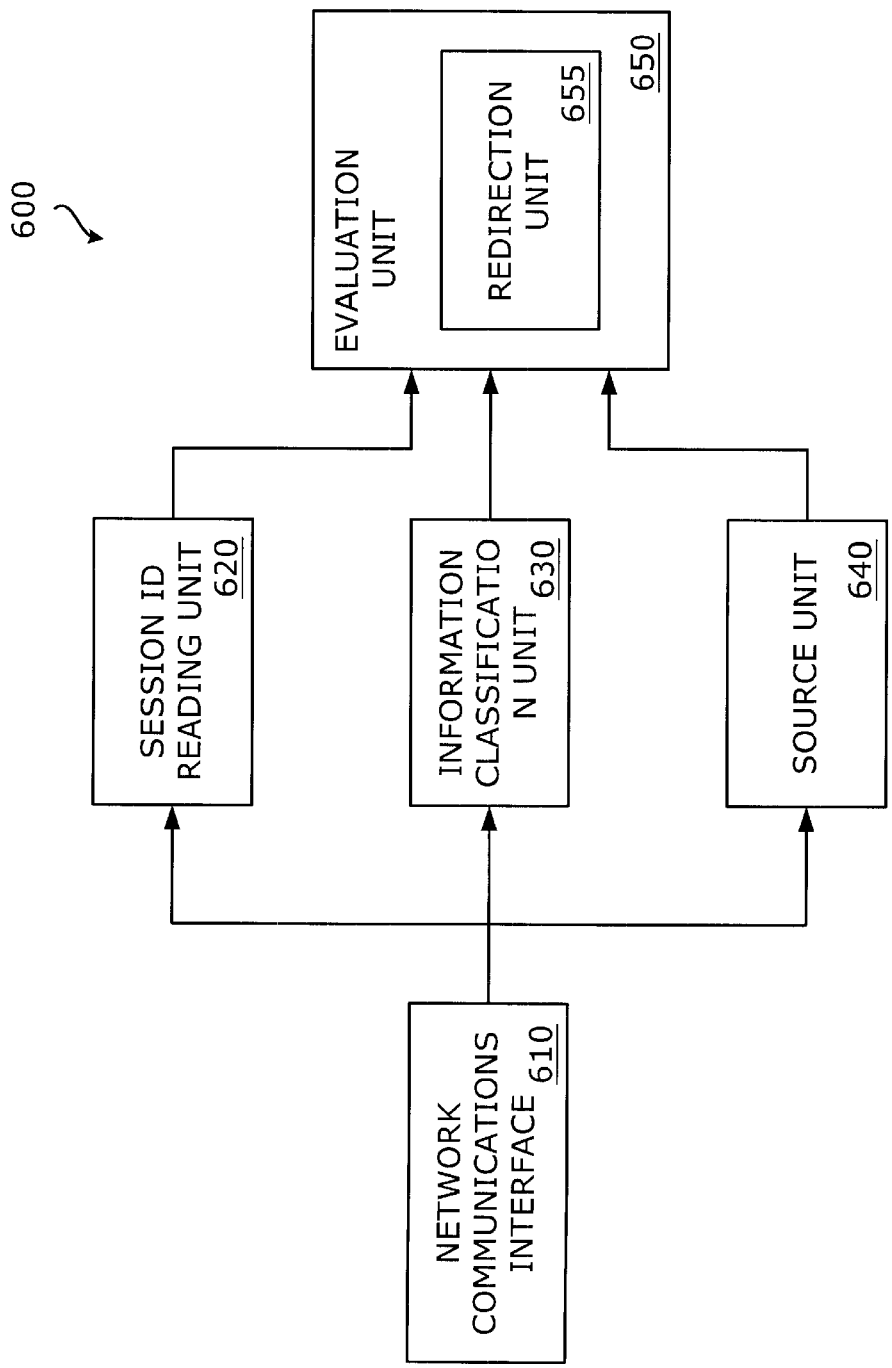
FIG. 6 is a block diagram of a filtering agent residing in a local computing resource according to an embodiment of the present invention.

FIG. 6 is a block diagram of a filtering agent 600 residing in the local server 230 (shown in FIG. 2) according to an embodiment of the present invention. The filtering agent 600 operates to filter documents received on one or more multicast channels by the network communications unit 250 (shown in FIG. 2) of the local computing resource 110 (shown in FIG. 2). In a preferred embodiment of the present invention, the filtering agent 600 is implemented by software and resides in main memory 430 (shown in FIG. 4) as a sequence of instructions in a computer system 400 that may be implemented as the local server 230 (shown in FIG. 2). It should be appreciated that the filtering agent 600 may also be implemented by hardware as components coupled to the bus 410 (shown in FIG. 4), a combination of both hardware and software, or a plurality of computers working together.

The filtering agent 600 includes a network communications interface 610. The network communications interface 610 interfaces with the network communications unit 250 and receives multicast documents transferred over multicast channels from the network operations center 130. The network communications interface 610, could also receive broadcast notification and channel activation, de-activation, and content assignment changes. In addition it should report new local computing resource channel subscriptions (e.g. multicast channel that are monitored at the local site) and profile changes to the network operations center 130.

A session identification reading unit 620 is coupled to the network communications interface 610. The session identification reading unit 620 receives the document from the network communications interface 610. This process may be "made aware" to listen for a session ID or specific document via an pre-announcement from the network operations center 130. In one embodiment, there is a separate announcement and schedule multicast channel. In another embodiment announcements are send via unicast. The session identification reading unit 620 analyzes the document for a session identification associated with the document and forwards the session identification to an evaluation unit 650. The session identification may be used by the filtering agent 600 to determine whether the document is the reply to a local user's request or includes relevant information and how to process the document. The session identification reading unit 620 may be configured to recognize that the session identification may be transmitted with the document as a cookie appended in the header of the document, as appended custom meta tags, or in a separate transmission announcement, or using other techniques and search for the session identification accordingly.

An information classification unit 630 is coupled to the network communications interface 610. The information classification unit 630 receives the document from the network communications interface 610. The information classification unit 630 analyzes the document for meta data relating to the content of the document. The meta data may used by the filtering agent 600 to determine whether the document includes relevant information and how to process the document. All meta data needed may be appended to the transmission or announced separately by 550 from 520. According to a first embodiment of the present invention, the information classification unit 630 reads meta tags in the document that provide subject matter, size, source, rating, keyword, or other information relating to the document and forwards the meta data to the evaluation unit 650. The meta tags may be published with the document, appended the network operations center 130, or other entity process. According to a second embodiment of the present invention, the information classification unit 630 reads the content of the document to determine relevant subject matter, size, source, rating, keyword or other information relating to the document and forwards the meta data to the evaluation unit 650. It should be appreciated that the second embodiment of the present invention may be implemented when meta tags with meta data are not supplied by the source of the document, the network operations center 130, or other process. The second embodiment of the present invention may also be implemented as a redundant operation or secondary meta data gathering process that may differ from the meta data gathering process in the network operations center 130.

A source unit 640 is coupled to the network communications interface 610. The source unit 640 receives the document from the network communications interface 610. The source unit 640 analyzes the document for source information relating to where the document originated. The source information may be used by the filtering agent 600 (via the evaluation unit 650) to determine whether the document includes relevant information and how to process the document. The source information may include a URL, domain or other source information that may be written in the body of the document. The source unit 640 transmits the source information to the evaluation unit 650.

The evaluation unit 650 is coupled to the session identification reading unit 620, the information classification unit 630, and the source unit 640. The evaluation circuit 650 receives the session identification associated with the document from the session identification reading unit 620. The evaluation circuit 650 determines whether the session identification corresponds. to a session being run by a client terminal on the local computing resource. According to an embodiment of the present invention, the evaluation circuit 650 accesses a session log to determine whether the session identification associated with the document matches the session identifications that are active on the local computing resource. In one embodiment, an announcement informs the evaluation unit 650 to look for a reply on a specific multicast channel. In an alternate embodiment, the session may be associated with a "Trusted User" like an "Instructor class user" to effect a push into cache. If the session identification associated with the document corresponds to a session being run by a client terminal on the local computing resource, the evaluation unit 650 recognizes that the document is a multicast response to a unicast request for the document made by the local computing resource. The evaluation circuit 650 forwards the document to the appropriate client terminal.

The evaluation unit 650 receives meta data associated with the document from the information classification unit 630. The evaluation unit 650 determines whether the document includes meta data that matches a local information profile of the local computing resource. According to an embodiment of the present invention, the evaluation unit 650 accesses a local information profile to determine whether the meta data associated with the document matches meta data. The evaluation unit 650 may decide whether to cache or discard the document based on the determination. In one embodiment, the local information profile may include inclusionary meta data that would prompt the evaluation unit 650 to cache the document. The inclusionary meta data may include anything on the subject Advanced Algebra for example. The meta data in the local information profile may also include exclusionary meta data that would prompt the evaluation unit 650 to discard the document. The exclusionary meta data may include keywords that include profanity, or subject matter that may be considered offensive or inappropriate to the users at the local computing resource. It should be appreciated that the local information profile may be configured by a system administrator, compiled dynamically based on prior requests for the document, or using other techniques or combinations of techniques.

The evaluation unit 650 receives source information associated with the document from the source unit 640. The evaluation unit 650 determines whether the document originated from a "Trusted" source that is recognized by the local computing resource. According to an embodiment of the present invention, the evaluation unit 650 accesses the local information profile to determine whether the source information associated with the document matches source information in the local information profile. The evaluation unit 650 may decide whether to cache or discard the document based on the determination. In one embodiment, the source information in the local information profile may include inclusionary source information that would prompt the evaluation unit 650 to cache the document. The inclusionary source information may include a private index of web sites, URLs, domain, sub domains, IP addresses or ranges of addresses, etc. (e.g. a database of educational web sites such as the National Geographic Society, and the NASA web site etc.) The meta data in the local information profile may also include exclusionary source information that would prompt the evaluation unit 650 to discard the document. The exclusionary source information may include adult oriented web sites, or web sites containing information that may be considered inappropriate for the users at the local computing resource. It should be appreciated that the local information profile may be configured by a system administrator, compiled dynamically based on prior requests for the document, or using other techniques such as AI and/or pattern recognition and matching. For example, the local information profile may be configured dynamically by an agent on the local server that includes URLs frequently accessed by users on the local computing resources as inclusionary source information. The local information profile may be later edited by a system administrator who may delete source information that may be inappropriate.

According to an embodiment of the present invention, the evaluation unit 650 includes a redirection unit 655. It should be appreciated that the redirection unit 655 may reside inside the evaluation unit 650 as shown in FIG. 6 or alternatively reside external to the evaluation unit 650. The redirection unit 655 "spoofs" or plays the role of a host server that sources requested documents. According to an embodiment of the present invention, the redirection unit 655 "feeds" or "serves" packets of data that constitute that document to a proxy at the local computing resource that believes it is talking to the host server. This allows the proxy to operate as it would if it had made a unicast HTTP connection with the host server. According to an alternate embodiment of the present invention, the redirect unit 655 messages the proxy at the local computing resource that it has the document that was requested. In response, the proxy stops attempting to connect to the host server. The proxy then plays the role of the host server to the client terminal requesting the document.

It should be appreciated that the filtering agent 600 may utilize one or all of the session identification reading unit 620, information classification unit 630, and source unit 640 when determining whether a document includes relevant information and whether to forward the document to a client and whether to cache the document. For example, the meta data from the information classification unit 630 and the source information from the source unit 640 may be used to deny a client terminal access to the requested document regardless of whether a session identification match exists. Alternatively, a weighting protocol may be utilized in situations when the meta data and source information generates conflicting inclusionary/exclusionary results.

Figure 7:
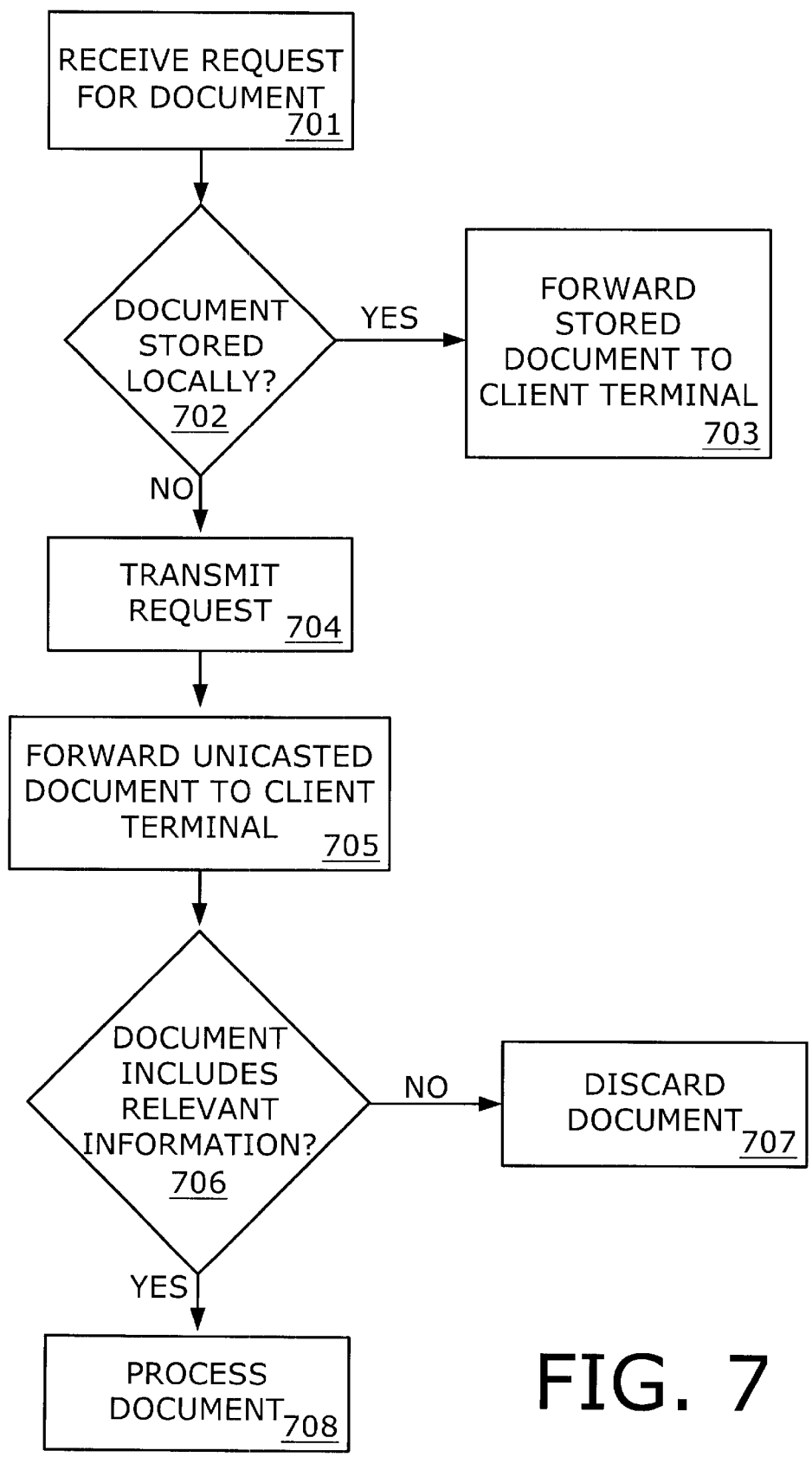
FIG. 7 is a flow chart illustrating a method for managing documents in a local computing resource according to an embodiment of the present invention.

The network communications interface 610, session identification reading unit 620, information classification unit 630, source unit 640, and evaluation unit 650 may be implemented using any known circuitry or technique. In an embodiment of the present invention where the filtering agent 600 is implemented in hardware, the network communications interface 610, session identification reading unit 620, information classification unit 630, source unit 640, and evaluation unit 650 all reside on a single semiconductor substrate. In a preferred embodiment of the present invention, the filtering agent 600 is implemented by software proxy server plug-ins or packet filtering extensions FIG. 7 is a flow chart illustrating a method for managing a document at a local computing resource according to an embodiment of the present invention. At step 701, a request for a document is received from a client terminal. The request for the document may be a request to receive an HTML file from a remote server. The request may include an URL that corresponds to where the HTML file is located.

At step 702, it is determined whether the document requested is stored locally at the local computing resource. Determining whether the document requested is stored locally may be achieved by checking a web cache or other storage device at the local computing resource, which may need to check with the original host to see if the cached copy is up-to-date. If the document requested is stored locally and is not expired or out-of-date, control proceeds to step 703. If the document requested is not stored locally or is expired or out-of-date, control proceeds to step 704.

At step 703, the document requested is forwarded from the storage device to the client terminal and a "Hit" notification is sent to the original host, usually via the master proxy server. The request for the document is not transmitted to the source of the document. According to an embodiment of the present invention, the request is logged in a local computing resource information profile.

At step 704, the request for the document is transmitted or redirected to an external system. According to an embodiment of the present invention, the request for the document is transmitted to a master proxy server on a network operations center which has a connection to the source of the document or its own cached copy of the document or a mirror of the original host server. The network operations center may operate as a master proxy server or an ISP for the local computing resource. When transmitting the request for a document to the network operations center, the local computing resource may also transmit session information that includes or points to information about the user requesting the document such as a session identification. According to an alternate embodiment of the present invention where the local computing resource has a connection to the source of the document, the request for a document is transmitted to the source of the document with instructions to return the requested document to the network operations center 130, such request containing the session identifier to be read by the session profile unit (510) and session ID reading unit (620).

At step 705, a document received from a unicast channel is forwarded to a client terminal requesting the document or a unicast or multicast announcement of a multicast transfer of the requested document "Alerts" the session identification reading unit to look-out. Alternately or simultaneously, as part of step 704, the session ID and document request are placed in a "Waiting for reply" queue that is read by the session identification reading unit and acts as the announcement to look-out for that same session ID on all monitored multicast channels.

Figure 8:
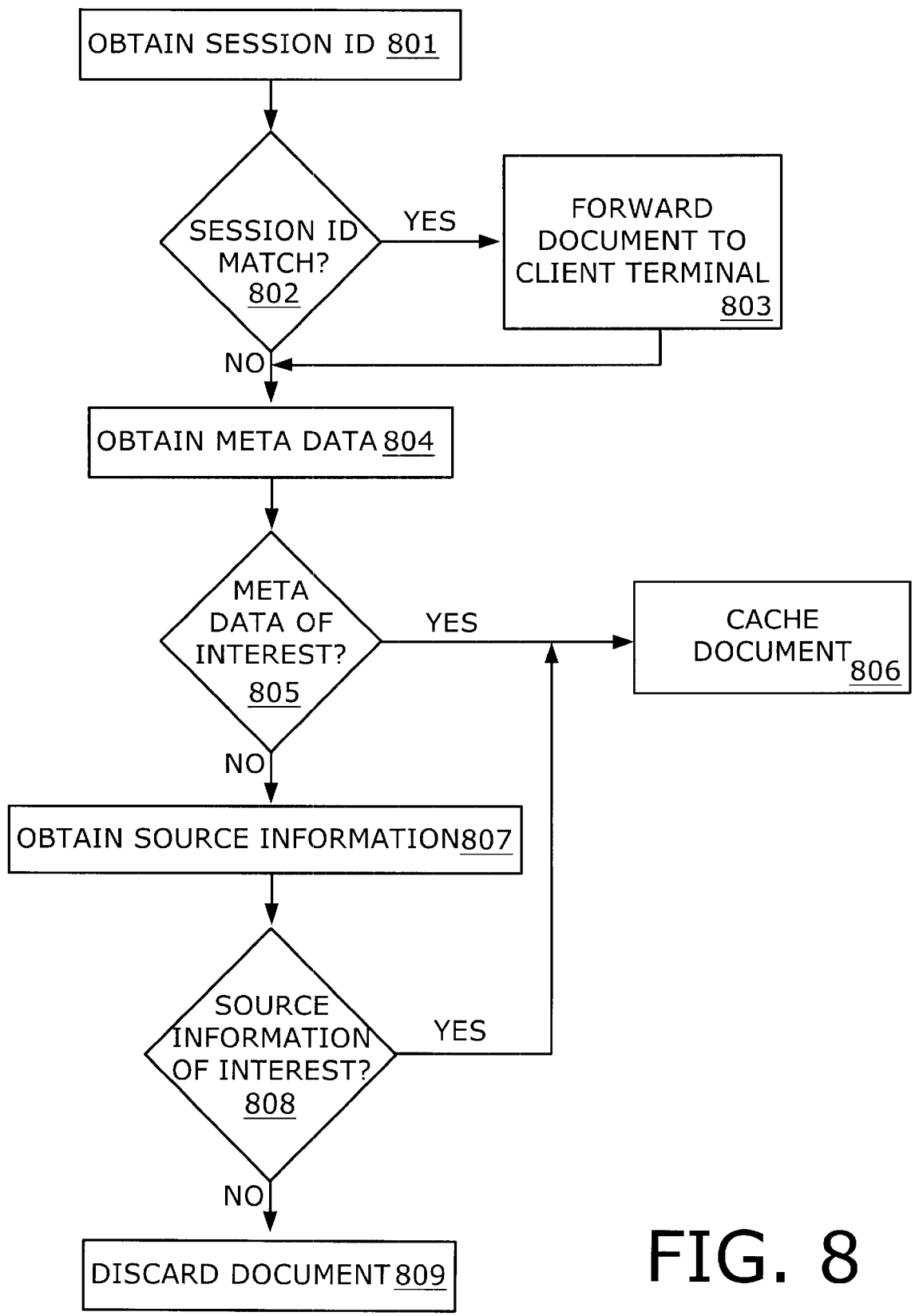
FIG. 8 is a flow chart illustrating a method for filtering documents in a local computing resource according to an embodiment of the present invention.

At step 706, it is determined whether a document received from a multicast channel contains relevant information and/or is a reply to a local user's request and has a session ID associated with a client terminal that location. According to an embodiment of the present invention, determining whether the document received includes relevant information includes determining whether the document may be used by a client terminal associated with a local computing resource. If the document received does not contain relevant information, control proceeds to step 707. If the document received contains relevant information, control proceeds to step 708. FIG. 8 is a block diagram illustrating the steps of how determining whether a document received contains relevant information is achieved according to an embodiment of the present invention.

At step 707, the document is discarded.

At step 708, the document is consumed or stored for later consumption by the local computer resource. According to an embodiment of the present invention, the document received is determined to be requested by a client terminal and is forwarded to the client terminal. The document requested may be received from either the network operations center or the source of the document directly depending on how the request was made. It should be appreciated that the document requested may be unicasted or multicasted to the local computing resource and that the local computing resource may examine the requested document using known techniques to determine the identity of the client terminal to forward the document. The document received may also be cached locally on a storage device.

FIG. 8 is a flow chart illustrating a method for filtering a document at a local computing resource according to an embodiment of the present invention. At step 801, a session identification is obtained from the document or an associated announcement. According to an embodiment of the present invention, the session identification may be obtained by a session identification reading unit 620 (shown in. FIG. 6). The session identification reading unit 620 analyzes the document for a session identification associated with the document. The session identification reading unit 620 may be configured to recognize that the session identification may be transmitted with the document as a cookie appended in the header of the document, unique meta tags in the body, or using other techniques and search for the session identification accordingly.

At step 802, it is determined whether the session identification associated with the document corresponds with an active session run by a client terminal on a local computing resource. According to an embodiment of the present invention, the determination is made by an evaluation circuit 650 (shown in FIG. 6). The evaluation circuit accesses a session log to determine whether the session identification associated with the document matches the session identifications that are active on the local computing resource. If the session identification associated with the document matches a session run by a client terminal, control proceeds to step 803. If the session identification associated with the document does not match a session run at the client terminal, control proceeds to step 804.

At step 803, the document is forwarded to the client terminal. If the session identification associated with the document corresponds to a session being run by a client terminal on the local computing resource, the document is recognized as a multicast response to a unicast request for the document made by the client terminal. The local proxy must spoofs a unicast reply to the original request.

At step 804, meta data associated with a transferred document is obtained. According to an embodiment of the present invention, the meta data may be obtained by an information classification unit 630 (shown in FIG. 6). The information classification unit 630 may obtain meta data from the document from meta tags in the document or by reading the content of the document to determine relevant subject matter, size, source, rating, keyword or other information relating to the document.

At step 805, it is determined whether the meta data associated with the document is of interest to the local computing resource. According to an embodiment of the present invention determining whether the meta data is a match for local interests is performed by the evaluation unit 650. The evaluation unit 650 accesses a local information profile to determine whether the meta data associated with the document matches meta data in the local information profile. The evaluation unit 650 may decide whether to cache or discard the document based on the determination. The local information profile may include inclusionary or exclusionary meta data that may be configured by a system administrator, dynamically based on prior information consumption, or using other techniques or combination of techniques. If the meta data associated with the document is recognized as inclusionary, control proceeds to step 806. If the meta data associated with the document is not recognized, control proceeds to step 807. It should be appreciated that even if the document is of interest to the local computing resource, if the document includes a meta tag which indicates that the document should not be cached, control proceeds to step 809.

At step 806, the document is pushed into cache. According to an embodiment of the present invention when the proxy at the local computing resource believes it has a unicast connection with the host server, the document is pushed into the cache. In an alternate embodiment of the present invention, the redirect unit 655 (shown in FIG. 6) pretends to be a client terminal and requests the document from the proxy at the local computing resource. The redirect unit 655 intercepts the proxy's forwarded request for the document and pretends to be a host server having the document. The proxy caches the document as it forwards the document back to the redirect unit, which just discards it.

At step 807, source information is obtained. According to an embodiment of the present invention, the source information may be obtained by the source unit 640 (shown in FIG. 6). The source unit 640 analyzes the document for source information relating to where the document originated.

At step 808, it is determined whether the source information associated with the document is of interest to the local computing resource. According to an embodiment of the present invention, determining whether the source information is of interest to the local computing resource is performed by the evaluation unit 650. The evaluation unit 650 accesses a local information profile to determine whether the source information associated with the document matches source information in the local information profile. The evaluation unit 650 may decide whether to cache or discard the document based on the determination. The local information profile may include inclusionary or exclusionary source information that may be configured by a system administrator, dynamically based on prior information consumed, or using other techniques or combination of techniques. If the source information is recognized as inclusionary, control proceeds to step 806. If the source information is not recognized or is recognized as exclusionary, control proceeds to step 809.

At step 809, the document is discarded.

It should be appreciated that the steps in FIG. 8 may be performed in an order other than that which is illustrated. For example, the steps of determining whether the meta data is recognized and whether the source information is recognized may be performed at the same time or in opposite order. A process that resolves any discrepancies in the results may be implemented.

Figure 9:
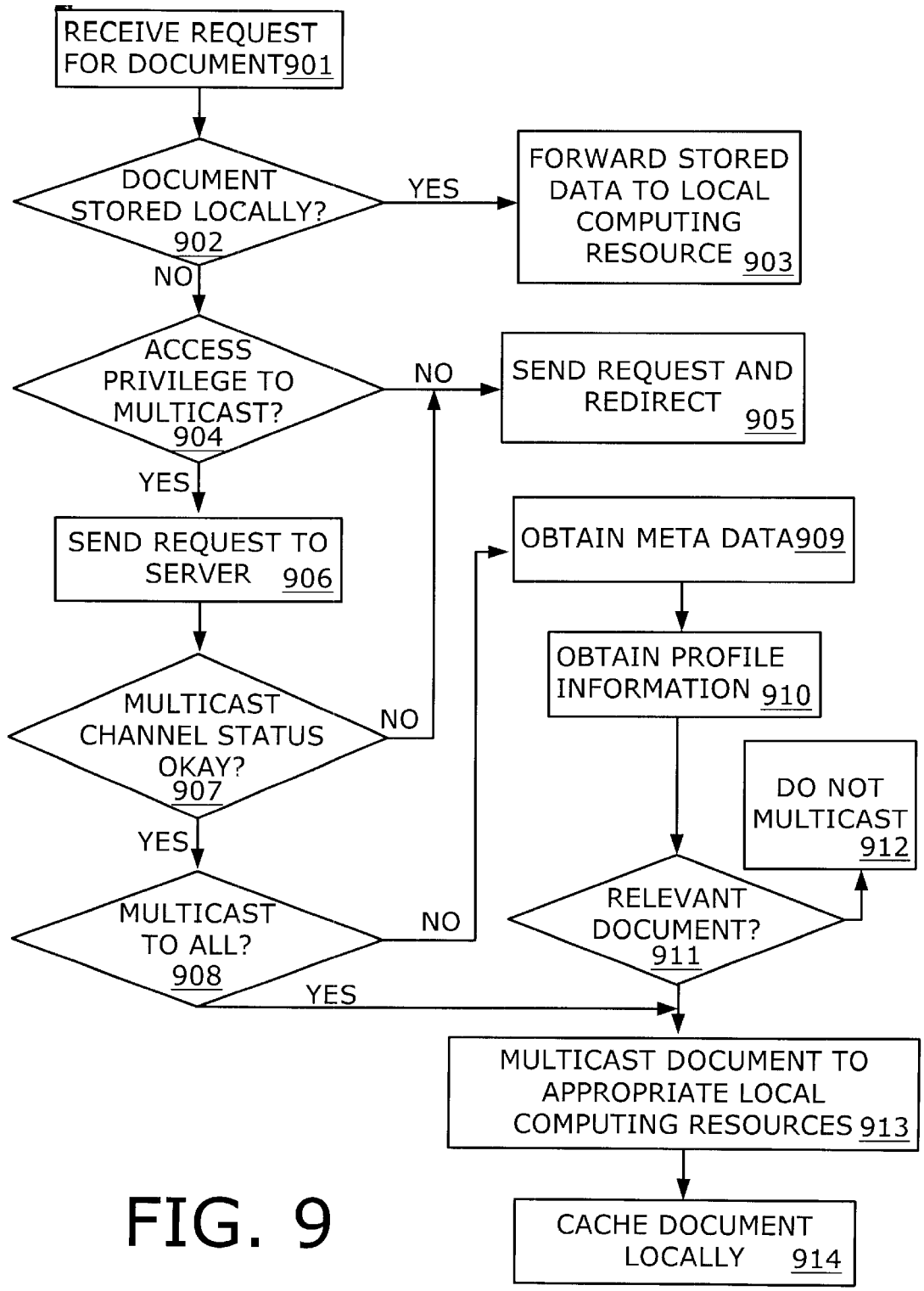
FIG. 9 is a flow chart illustrating a method for managing documents in a network operations center according to an embodiment of the present invention.

FIG. 9 is a flow chart illustrating a method for managing a document at a network operations center according to an embodiment of the present invention. At step 901, a request for a document is received from a local computing resource. The request if for the document may be a request to receive an HTML file from a remote server. The request may include an URL that corresponds to where the HTML file is located.

At step 902, it is determined whether the document requested is stored locally at the network operations center. Determining whether the document requested is stored locally may be achieved by checking a web cache or other storage device at the network operations center to determine whether the document requested was previously stored locally. If the document requested is stored locally, control proceeds to step 903. In one embodiment the original host is checked to assure the cache copy is fresh (Up-to-date) before proceeding to 903. If the document requested is not stored locally, or is out-of-date, control proceeds to step 904.

At step 903, the document requested is forwarded from the storage device to the client terminal. The document is not retrieved from the source. In one embodiment, a "Hit" may be sent to the host to allow the host to account for the fact that the document was requested. According to an embodiment of the present invention, the stored document may be checked to see if its time stamp is up to date by checking with the original host. If the time stamp is not up to date, control may proceed to step 904. In another embodiment, step 903 might additionally check to see if the document has been evaluated for multicasting, and if not jump to step 907 in order to consider multicasting the cached document to non-requesting local computing resources. In this case, if 907 returns a no, then 903 proceeds as normal.

At step 904, a determination is made as to whether the user requesting the document has appropriate access privileges to effectuate multicasting the document to other local computing resources upon receipt of the document. The determination may be made by examining session information corresponding to the request. The session information includes information about the user and access privileges that belong to the user. If there are insufficient access privileges to effectuate multicasting the document upon receipt, control proceeds to step 905. If there are sufficient access privileges to effectuate multicasting the document upon receipt, control proceeds to step 906. According to an embodiment of the present invention, the examining session information may be achieved by a session profile unit 510 (shown in FIG. 5).

At step 905, the request for the document is forwarded to the source host for unicast return to the original requesting terminal. The session identification should still be appended by the client.

At step 906, the request for the document is transmitted to the source of the document with directions to direct the requested document back to the network operations center, such as a reply address. Session identification is still appended.

At step 907, it is determined whether the multicast channel which the document is to be transmitted on is in proper working order. If for example, the multicast channel is not active or is experiencing large latency, control proceeds to step 905. If the multicast channel is in proper working order control proceeds to step 908. According to an embodiment of the present invention, determining whether the multicast channel is in proper working order may be achieved by the system status profile unit 540 (shown in FIG. 5).

At step 908, a determination is made as to whether the user requesting the document has appropriate access privilege to effectuate multicasting the requested document to some or all local computing resources on the network by sending on one or more active multicast channels. The determination is made by examining session information corresponding to the request. If sufficient access privileges exist, control proceeds to step 913. If sufficient access privileges do not exist, control proceeds to step 909. According to an embodiment of the present invention, examining session information corresponding to the request may be achieved by the session profile unit 510. In an alternate embodiment, control may proceed to step 913 directly and select from a list of active multicast channels to transmit the document.

At step 909, meta data relating to the requested document is obtained. Step 909 can not proceed until the entire document is received in response to step 906. The meta data may include information relating to the subject matter, size, source, keyword, format, rating, or other data. According to an embodiment of the present invention, the meta data may be obtained from meta tags in the requested document. According to an alternate embodiment of the present invention, meta data may be obtained by reading the content of the document. In one embodiment, obtaining meta data may be achieved by a document profile unit 520 (shown in FIG. 5).

At step 910, profile information relating to the local computing resources on the network are obtained. The profile information may include information relating to the subject matter, size, source, key word, rating or other data that the local computing resources would like to receive. The profile information may also include the identity of multicast channels on which to transmit the document to the local computing resources. According to one embodiment of the present invention, obtaining profile information may be achieved by a local computing resource profile unit 530 (shown in FIG. 5).

At step 911, a determination is made as to whether the requested document is a relevant document to multicast to non-requesting local computing resources on one or more active multicast channels. According to an embodiment of the present invention, the determination is made by comparing the meta data with active multicast channel profile information for matches and/or exclusions. It should be appreciated that other techniques for making the determination may also be utilized. If it is determined that the requested document does not include relevant data to any group or class of local users nor match any active multicast channel profile, control proceeds to step 912. If it is determined that the requested document includes relevant data, control proceeds to step 913. According to one embodiment of the present invention, determining whether the requested document includes relevant data is achieved by a document transmission unit 550 (shown in FIG. 5).

At step 912, the requested document is not multicasted to non-requesting local computing resources. Instead, the requested document is transmitted to the requesting local computing resource using unicast techniques.

At step 913, the requested document is multicasted on appropriate multicast channel(s) to appropriate local computing resources. Step 913 can not proceed until the entire document is received in response to step 906. In an alternate embodiment, the document can be sent to all matching local computing resource by announcing to them the channel and time of multicasting of that document and perhaps the associated session identification to look for. The local computing resources may filter the document to determine for itself whether the document includes relevant information. The requested document is also multicasted to the local computing resource requesting the document. Alternately, the document could be unicasted back to the original requesting local computing resource. The multicasting may be achieved by using batch processing where other documents stored locally on the web cache are multicasted with the requested document to the appropriate local computing resources.

At step 914, the requested document may be cached locally at the network operations center.

It should be appreciated that the network operations center managing the document may be used only for performing the steps for supporting multicasting and/or unicasting as set out in steps 907–913. In an embodiment of the present invention where a local computing resource has a connection to a source of the requested document, the local computing resource may redirect the source of the requested document to transmit the document to the network operations center where steps 907–914 are performed to provide a multicast response to a unicast request.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method comprising:
   automatically defining a set of preferences for each local computing resource that determines what information is relevant to the local computing resource;
   receiving a document from a multicast channel,
   determining if the document includes relevant information by reading published meta tags in the document for meta data, and determining whether the meta data is of interest to the local computing resource; and
   processing the document if the document includes relevant information.

2. The method of claim 1, wherein determining if the document includes relevant information further comprises:
   obtaining a session identification associated with a request for the document; and
   determining whether the session identification corresponds to an active session run on a client terminal.

3. The method of claim 1, wherein reading published meta tags in the document for the meta data further comprises analyzing the content of the document.

4. The method of claim 1, wherein determining whether the meta data is of interest to the local computing resource comprises referencing a local information profile to determine whether the meta data is indexed in the local information profile.

5. The method of claim 1, wherein determining if the document includes relevant information further comprises:
   obtaining source information associated with the document; and
   determining whether the source information corresponds to the set of preferences for the local computing resource.

6. The method of claim 1, wherein determining whether the source information is of interest to the local computing resource comprises referencing a local information profile to determine whether the source information is indexed in the local information profile.

7. The method of claim 1, wherein processing the document comprises forwarding the document to a client terminal that requested the document.

8. The method of claim 1, wherein processing the document comprises caching the document in a storage device.

9. An article comprising a computer-readable medium having stored thereon a sequence of instructions that, when executed, cause one or more electronic systems to:
   automatically define a set of preferences for each local computing resource that determines what information is relevant to the local computing resource;
   receive a document from a multicast channel;
   determine whether the document includes relevant information by reading published meta tags in the document for meta data, and determining whether the meta data is of interest to the local computing resource; and
   process the document if the document includes relevant information.

10. The article of claim 9, wherein the sequences of instructions that cause the one or more electronic systems to determine if the document includes relevant information further comprise sequences of instructions that, when executed, cause the one or more electronic systems to:
    obtain a session identification associated with a request for the document; and
    determine whether the session identification corresponds to an active session run on a client terminal.

11. The computer-readable medium of claim 9, wherein determining if the document includes relevant information comprises:
    obtaining meta data associated with the document; and
    determining whether the meta data is of interest to a local computing resource.

12. The article of claim 9, wherein the sequences of instructions that cause the one or more electronic systems to determine if the document includes relevant information by reading published meta tags in the document for the meta data further comprise sequences of instructions that, when executed, cause the one or more electronic systems to determine if the document includes relevant information by analyzing the content of the document.

13. The article of claim 9, wherein the sequences of instructions that cause the one or more electronic systems to determine whether the meta data is of interest to the local computing resource comprise sequences of instructions that, when executed, cause the one or more electronic systems to reference a local information profile to determine whether the meta data is indexed in the local information profile.

14. The article of claim 9, wherein the sequences of instructions that cause the one or more electronic systems to determine if the document includes relevant information further comprise sequences of instructions that, when executed, cause the one or more electronic systems to:
    obtain source information associated with the document; and
    determine whether the source information corresponds to set of preferences for the local computing resource.

15. The article of claim 14, wherein the sequences of instructions that cause the one or more electronic systems to determine whether the source information is of interest to the local computing resource comprise sequences of instructions that, when executed, cause the one or more electronic systems to reference a local information profile to determine whether the source information is indexed in the local information profile.

16. The article of claim 9, wherein the sequences of instructions that cause the one or more electronic systems to process the document comprise sequences of instructions that, when executed cause the one or more electronic systems to forward the document to a client terminal that requested the document.

17. The article of claim 9, wherein the sequences of instructions that cause the one or more electronic systems to process the document comprise sequences of instructions that, when executed, cause the one or more electronic systems to cache the document in a storage device.

18. The article of claim 9 wherein the sequences of instructions that cause the one or more electronic systems to determine whether the document includes relevant information by reading published meta tags in the document for the meta data and determining whether the meta data is of interest to the local computing resource further comprises sequences of instructions that, when executed, cause the one or more electronic systems to determine whether the document includes relevant information by analyzing the content of the document.

19. A filtering agent, comprising:
    a session identification reading unit that retrieves a session identification from a document transferred over a multicast channel;

an information classification unit that retrieves meta data from the document by reading published meta tags in the document for the meta data;

a source unit that retrieves source information from the document; and an evaluation unit, coupled to the session identification reading unit, information classification unit, and the source unit, that determines whether the session identification, meta data, and the source information is of interest to a local computing resource.

20. The filtering agent in claim 19, wherein the session identification reading unit further determines whether the session identification corresponds to an active session run on a client terminal.

* * * * *